(12) United States Patent
Tsukamoto et al.

(10) Patent No.: US 7,893,659 B2
(45) Date of Patent: *Feb. 22, 2011

(54) METHOD AND APPARATUS FOR AMPLITUDE LIMITING BATTERY TEMPERATURE SPIKES

(75) Inventors: Hisashi Tsukamoto, Santa Clarita, CA (US); David Skinlo, Valencia, CA (US); Clay Kishiyama, Burbank, CA (US); Joanna Dodd, Burbank, CA (US)

(73) Assignee: Quallion LLC, Sylmar, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/290,231

(22) Filed: Oct. 27, 2008

(65) Prior Publication Data

US 2009/0176149 A1    Jul. 9, 2009

Related U.S. Application Data

(63) Continuation of application No. 10/500,907, filed as application No. PCT/US03/00565 on Jan. 8, 2003, now Pat. No. 7,443,136, which is a continuation-in-part of application No. 10/042,898, filed on Jan. 9, 2002, now Pat. No. 6,586,912.

(51) Int. Cl.
*H01M 10/46* (2006.01)
(52) U.S. Cl. .................................... 320/150
(58) Field of Classification Search ............ 320/107, 320/112, 150, 153
See application file for complete search history.

(56) References Cited

U.S. PATENT DOCUMENTS

| | | | |
|---|---|---|---|
| 2,999,969 A | 9/1961 | Fritzinger | |
| 3,207,631 A | 9/1965 | Zaromb | |
| 3,328,642 A | 6/1967 | Haumesser | |
| 3,537,907 A | 11/1970 | Wilson | |
| 3,548,930 A | 12/1970 | Byrd | |
| 3,749,332 A | 7/1973 | Gray | |
| 3,822,150 A | 7/1974 | Beardshear et al. | |
| 3,865,630 A | 2/1975 | Reimers | |

(Continued)

FOREIGN PATENT DOCUMENTS

| | | |
|---|---|---|
| EP | 0 806 806 A1 | 11/1997 |
| EP | 0 806 806 B1 | 1/2002 |
| JP | 62-154555 A2 | 7/1967 |
| JP | 55-119347 A2 | 3/1979 |
| JP | 55-111060 | 8/1980 |

(Continued)

OTHER PUBLICATIONS

"Nasa—International Space Station Status Report #00-10" NASA, Mar. 9, 2000 http://www.nasa.govcenters/johnson/news/station/2000/iss00-10.html , 1 page.

(Continued)

*Primary Examiner*—Edward Tso
(74) *Attorney, Agent, or Firm*—Gavnlovich, Dodd & Lindsey, LLP

(57) ABSTRACT

A method and apparatus for containing heat generated by a battery to reduce the amplitude of a temperature excursion to enhance safety in temperature critical applications, such as in implantable medical devices. The apparatus employs a heat absorber (38) closely thermally coupled to the battery (30). The heat absorber includes heat-absorbing material preferably exhibiting an endothermic phase change at a temperature below that produced by the battery.

15 Claims, 5 Drawing Sheets

U.S. PATENT DOCUMENTS

| | | | |
|---|---|---|---|
| 4,022,952 | A | 5/1977 | Fritts |
| 4,075,400 | A | 2/1978 | Fritts |
| 4,314,008 | A | 2/1982 | Blake |
| 4,673,030 | A | 6/1987 | Basiulis |
| 4,741,979 | A | 5/1988 | Faust et al. |
| 5,074,283 | A | 12/1991 | Beatty et al. |
| 5,142,884 | A | 9/1992 | Scaringe et al. |
| 5,158,841 | A | 10/1992 | Mennicke et al. |
| 5,332,030 | A | 7/1994 | Spencer et al. |
| 5,343,368 | A | 8/1994 | Miller |
| 5,478,667 | A | 12/1995 | Shackle et al. |
| 5,625,273 | A | 4/1997 | Fehling et al. |
| 5,669,584 | A | 9/1997 | Hickey |
| 5,684,663 | A | 11/1997 | Mitter |
| 5,763,118 | A | 6/1998 | Stafford et al. |
| 5,766,793 | A | 6/1998 | Kamelsh et al. |
| 5,898,356 | A | 4/1999 | Gascoyne et al. |
| 6,010,800 | A | 1/2000 | Stadnick et al. |
| 6,027,077 | A | 2/2000 | Eller et al. |
| 6,073,888 | A | 6/2000 | Gelon et al. |
| 6,074,774 | A | 6/2000 | Semmens et al. |
| 6,127,438 | A | 10/2000 | Hasegawa et al. |
| 6,172,482 | B1 | 1/2001 | Eguchi |
| 6,176,453 | B1 | 1/2001 | Long et al. |
| 6,210,824 | B1 | 4/2001 | Sullivan et al. |
| 6,241,193 | B1 | 6/2001 | Cassagne et al. |
| 6,242,893 | B1 | 6/2001 | Freedman |
| 6,252,762 | B1 | 6/2001 | Amatucci |
| 6,268,713 | B1 | 7/2001 | Thandlwe |
| 6,468,689 | B1 | 10/2002 | Hallaj et al. |
| 6,478,257 | B1 | 11/2002 | Oh et al. |
| 6,531,847 | B1 | 3/2003 | Tsukamoto et al. |
| 6,586,912 | B1 * | 7/2003 | Tsukamoto et al. ......... 320/150 |
| 6,596,433 | B2 | 7/2003 | Gudmundsson et al. |
| 6,627,344 | B2 | 9/2003 | Kang et al. |
| 6,891,353 | B2 | 5/2005 | Tsukamoto et al. |
| 7,443,136 | B2 | 10/2008 | Tsukamoto et al. |
| 7,592,776 | B2 | 9/2009 | Tsukamoto et al. |
| 2001/0016289 | A1 | 8/2001 | Oura et al. |
| 2004/0004464 | A1 | 1/2004 | Tsukamoto et al. |

FOREIGN PATENT DOCUMENTS

| | | | |
|---|---|---|---|
| JP | 55-119346 | A2 | 9/1980 |
| JP | 57-138774 | A2 | 2/1981 |
| JP | 56-028463 | A2 | 3/1981 |
| JP | 56-162474 | A2 | 12/1981 |
| JP | 58-162473 | A2 | 12/1981 |
| JP | 58-128652 | A2 | 1/1982 |
| JP | 67-072272 | A2 | 5/1982 |
| JP | 59-063668 | A2 | 10/1982 |
| JP | 58-082462 | A2 | 5/1983 |
| JP | 58-097255 | A2 | 6/1983 |
| JP | 58-209059 | A2 | 12/1983 |
| JP | 59-090353 | A2 | 5/1984 |
| JP | 59-128774 | A2 | 7/1984 |
| JP | 60-025157 | A2 | 2/1985 |
| JP | 60-077350 | A2 | 5/1985 |
| JP | 61-147473 | A2 | 7/1986 |
| JP | 01-140558 | A2 | 6/1989 |
| JP | 02054861 | A2 | 2/1990 |
| JP | 02-075152 | A2 | 3/1990 |
| JP | 02-148577 | A2 | 6/1990 |
| JP | 04-206339 | A2 | 11/1990 |
| JP | 07-029563 | A2 | 1/1995 |
| JP | 07-094189 | A2 | 4/1995 |
| JP | 07-130349 | A2 | 5/1995 |
| JP | 07-130347 | A2 | 6/1995 |
| JP | 07-272702 | A2 | 10/1995 |
| JP | 07-272717 | A2 | 10/1995 |
| JP | 08-106886 | A2 | 4/1996 |
| JP | 08-138635 | A2 | 5/1996 |
| JP | 08-241709 | A2 | 9/1996 |
| JP | 09-237616 | A2 | 9/1997 |
| JP | 10-031997 | A2 | 2/1998 |
| JP | 10-050348 | A2 | 2/1998 |
| JP | 10-064548 | A2 | 3/1998 |
| JP | 10-064549 | A2 | 3/1998 |
| JP | 10-139918 | A2 | 5/1998 |
| JP | 10-297717 | A2 | 10/1998 |
| JP | 11-204151 | A2 | 7/1999 |
| JP | 11-236518 | A2 | 8/1999 |
| JP | 11-240970 | A2 | 9/1999 |
| JP | 11-268118 | A2 | 10/1999 |
| JP | 11-307081 | A2 | 11/1999 |
| JP | 2000100450 | A2 | 4/2000 |
| JP | 2000-285873 | A2 | 10/2000 |
| JP | 2001-043893 | A2 | 2/2001 |
| JP | 2001-060465 | A2 | 3/2001 |
| JP | 2001-060466 | A2 | 3/2001 |
| JP | 2001-307688 | A2 | 11/2001 |
| WO | WO 03/041208 | A1 | 5/2003 |
| WO | WO 03/061032 | A2 | 7/2003 |
| WO | WO 03/061032 | A3 | 7/2003 |

OTHER PUBLICATIONS

K. Ghali, Numerical and Experimental Investigation of the Effect of Phase Change Materials on Clothes During Periodic Ventilation, Proceedings of HT2003, 2003 ASME Summer Heat Transfer Conference, Jul. 21-23, 2003, Las Vegas, NV, USA, 8 pages.

E. Darcy et al., Phase Change Material Composite Heat Sinks for Space Batteries, 1 page.

Gaudi, Scott B. et al., Probing Structures of Distant Extrasolar Planets with Microlensing, 2003, The Astrophysical Journal, 586:527-539.

Cutler, James et al., OPAL: Smaller, Simpler, and Just Plain Luckier, 14th Annual AIAA/USU Conference on Small Satellites, Space Systems Development Laboratory Stanford University, Stanford, CA, 12 pages.

Wirtz, R.A. et al., Thermal Management Using "Dry" Phase Change Materials, Proc. Fifteenth IEEE Semiconductor Thermal Measurement and Management Symposium, Mar. 9-11, 1999, San Diego, CA, IEEE #99CH36306.

Radiation Heat Transfer Modeling Improved for Phase-Change, Thermal Energy Storage Systems, NASA Glenn's Research & Technology Reports, http://www.grc.nasa.gov/WWW/RT1997/6000/6920kerslake3.htm, 3 pages.

Hanil Electric Heat Engineering Company, http://www.han-il.com/tech/physical/liquid1k.htm, 8 pages.

Properties of Materials, Stock List & Technical Information, 16-4, www.tempco.com, 1 page.

Outlast Technologies, Inc., Phase Change Materials, www.outlast.com, http://www.outlast.com/index.php?id=95&L=0 , 2 pages.

NIST, Stand Reference Data Program, Online Databases, Chemistry WebBook, Nonane, http://www.dfmg.com.tw/member/chemical/cas/111-84-2.htm, 15 pages.

Cartridge Heaters, Engineering Data Gases, http://www.cartridge-heaters.com/EngineeringDatat_Liquids.htm , 3 pages.

Properties of Glycerine Physical Properties, 5 pages.

Benzene, www.knovel.com, 3 pages.

Formic Acid, www.knovel.com , 3 pages.

1,2-Diaminoethane, www.knovel.com, 2 pages.

1,4-Dioxane, www.knovel.com, 3 pages.

Trimethyl orthoformate, www.knovel.com, 1 page.

* cited by examiner

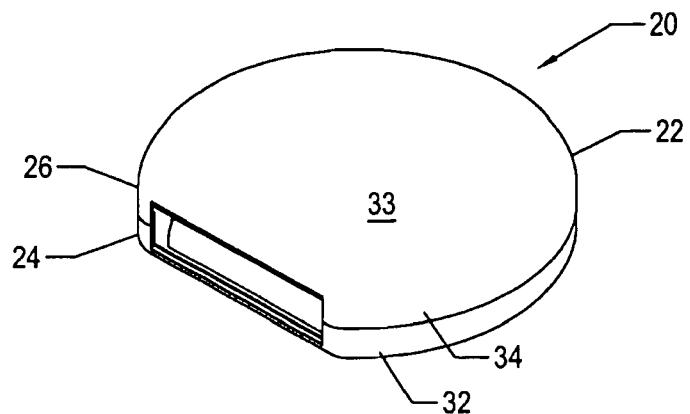
FIG. 1
FIGURE 1
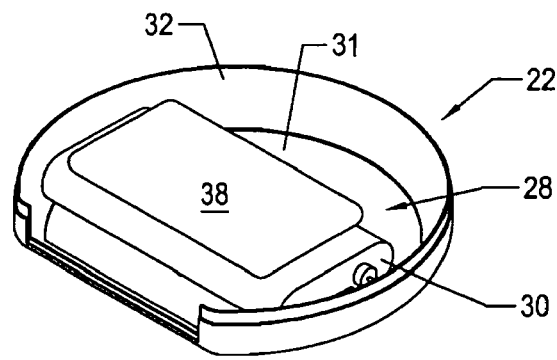
FIG. 2
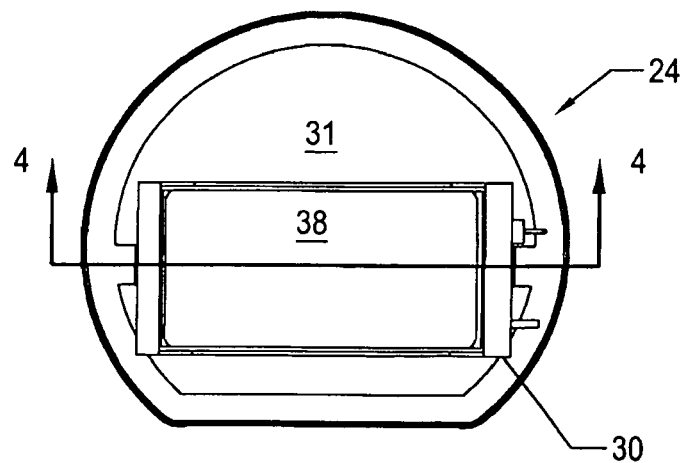
FIG. 3

METHOD AND APPARATUS FOR AMPLITUDE LIMITING BATTERY TEMPERATURE SPIKES

REFERENCE TO PRIOR FILED APPLICATIONS

This application is a continuation of U.S. patent application Ser. No. 10/500,907, filed on Jul. 2, 2004 now U.S. Pat. No. 7,443,136, and entitled "Method and Apparatus for Amplitude Limiting Battery Temperature Spikes," which claims priority to, and is the national stage of, PCT application serial number PCT/US03/00565, filed on Jan. 8, 2003, and entitled "Method and Apparatus for Amplitude Limiting Battery Temperature Spikes," which is a continuation-in-part of U.S. patent application Ser. No. 10/042,898, filed Jan. 9, 2002, now U.S. Pat. No. 6,586,912, and entitled "Method and Apparatus for Amplitude Limiting Battery Temperature Spikes," each of which is incorporated herein in its entirety by reference, including all disclosures submitted therewith.

TECHNICAL FIELD

This invention relates generally to energy storage devices, e.g., rechargeable batteries, and especially to such devices suitable for medical implantation in a patient's body. More particularly, this invention relates to a method and apparatus for limiting the amplitude of temperature spikes produced by such energy storage devices as a result of a malfunction such as an electric short.

BACKGROUND

Over the past several years, various medical devices have been developed which are designed to be implanted in a patient's body. Such devices are useful, for example, for stimulating internal body tissue (e.g., muscle, nerve, etc.) for a wide variety of medical applications. Many of these devices include a battery which can be recharged from an external power source via either a hard wire connection or wirelessly, e.g., via an alternating magnetic field. Although various battery technologies have been used, the lithium ion battery has evolved to generally be the battery of choice for implantable medical devices.

Under certain malfunction conditions, such as an internal or external electric short, a rechargeable lithium ion battery can produce a temperature excursion of 120° C. or more. A temperature of this amplitude can cause significant damage to body tissue.

SUMMARY

The present invention is directed to a method and apparatus for containing heat generated by an energy storage device (hereinafter generically referred to as a "battery") to reduce the amplitude of a temperature excursion in order to enhance safety in temperature critical applications, such as in implantable medical devices.

In accordance with the invention, a heat absorber is closely thermally coupled to the battery. The heat absorber is comprised of high heat capacity heat absorbing (HA) material which allows the rapid transference of considerable heat energy from the battery to the absorber, thereby reducing the temperature excursion and the risk of body tissue damage.

In accordance with a preferred embodiment, the HA material is selected to exhibit an endothermic phase change at a temperature T1 within a range of about 50° C. to 80° C. Temperatures in excess of this range can be readily produced by an electrically shorted battery. A preferred HA material in accordance with the invention includes paraffin and is selected to have a melting point of about 75° C.

In accordance with an exemplary application, the battery is comprised of a case formed of a conductive biocompatible material such as titanium or stainless steel. The case is mounted in a medical device housing also formed of a conductive biocompatible material such as titanium or stainless steel. The case is preferably mounted such that its wall surface is spaced from the housing wall surface to minimize heat transference therebetween. A heat absorber in accordance with the present invention is preferably mounted between the case wall and housing wall to absorb heat energy and reduce the rate of heat transference to the housing wall.

The heat absorber preferably comprises a mass of meltable material, e.g., paraffin, deposited into a fibrous containment mat preferably formed of dielectric fibers, e.g., KEVLAR or fiberglass. The heat absorber can be fabricated by depositing melted HA material onto the mat and then allowing it to solidify, e.g., at room temperature. The heat absorber can then be attached to the battery case prior to mounting the case in the medical device housing.

A heat absorber in accordance with the invention can be provided in multiple configurations. As already mentioned, the heat absorber can be physically configured to engage the case wall outer surface of a standard battery. Alternatively, a battery can be especially configured to include the HA material within the battery case. For example, the HA material can be formed as one or more strips (or plates) such that they can be integrated in a stack of positive electrode, negative electrode, and separator strips (or plates) forming an electrode assembly roll (or stack). Alternatively and/or additionally, the HA material can be configured to extend around the electrode assembly within the battery case.

BRIEF DESCRIPTION OF THE DRAWINGS

FIG. 1 is an isometric view of an exemplary implantable medical device;

FIG. 2 is an isometric view of the medical device of FIG. 1 with the cover removed to reveal a battery therein carrying a heat absorber in accordance with the present invention;

FIG. 3 is a plan view of the device of FIG. 2 showing the heat absorber mounted on the battery case;

DETAILED DESCRIPTION

Figure 4:
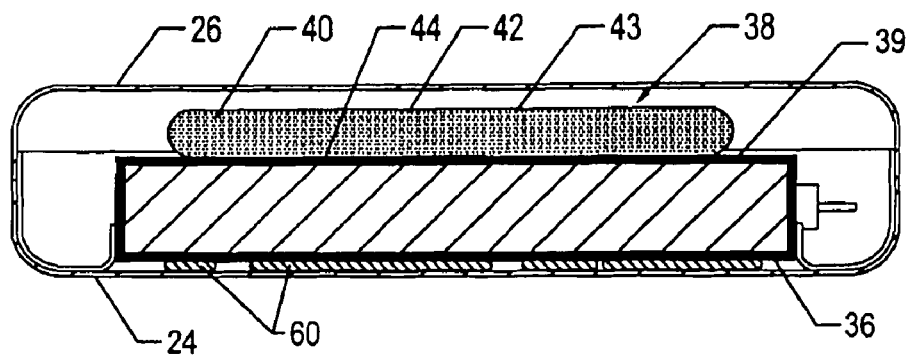
FIG. 4 is an enlarged view taken substantially along the plane 44 of FIG. 3 showing a preferred heat absorber directly attached to the battery case where the heat absorber comprises a quantity of heat absorbing material surrounding an embedded fibrous containment mat.

Attention is initially directed to FIG. 1, which illustrates an exemplary implantable medical device 20. The device 20 is comprised of a device housing 22 including a lower mounting member 24 and an upper cover member 26. The housing members 24 and 26 mate together to enclose an interior volume for accommodating electronic circuitry and a power source, e.g., an energy storage device such as a rechargeable lithium ion battery. For simplicity, the term "battery" will generally be used hereinafter to generically refer to any type of energy storage device.

FIGS. 2 and 3 illustrate the device housing 22 with the cover member 26 removed to show the interior volume 28 for accommodating a battery 30 for driving electronic circuitry (not shown) also accommodated in the interior volume 28. Mounting member 24 is formed by a wall of suitable biocompatible material, e.g., titanium or stainless steel, shaped to essentially form a cup comprised of a floor portion 31 and a peripheral wall portion 32. The mounting member 24 forms a partial boundary of interior volume 28. The remainder of the boundary is defined by the lid portion 33 and peripheral wall portion 34 of the cover member 26 which is typically formed of the same biocompatible material. The respective peripheral wall portions 32 and 34 are configured to mate to enable the device housing 22 to be hermetically sealed.

Figure 6:
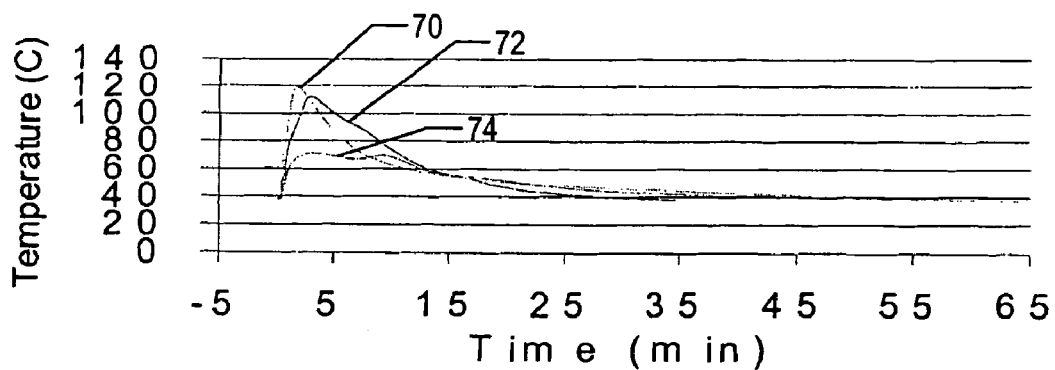
FIG. 6 is a chart depicting respective exemplary temperature excursions produced by a shorted battery (1) without a heat absorber and (2) with a heat absorber in accordance with the present invention.

It is well known that under certain malfunction conditions, e.g., an electric short circuit, a rechargeable battery can produce a very high temperature excursion up to 120° C. or more (see FIG. 6). Temperature excursions of this amplitude can cause significant damage in temperature critical applications such as implanted medical devices. The present invention is primarily directed to providing a method and apparatus for limiting the amplitude of temperature spikes produced by battery 30 to avoid temperature induced damage. In accordance with the invention, temperature excursions are limited by utilizing a heat absorber thermally coupled to the battery 30 to extract heat therefrom.

The battery 30 is comprised of a case 36 formed by a case wall defining an interior volume for accommodating an electrode assembly and electrolyte. The case wall is typically formed of a substantially rigid metal material such as titanium or stainless steel but can be formed of other materials, e.g., a flexible polymer. In the embodiment depicted in FIGS. 2 and 3, a heat absorber 38 in accordance with the invention is directly mounted on the exterior surface 39 of case 36 for absorbing heat energy generated by the battery 30.

The heat absorber 38 in accordance with the present invention is preferably comprised of a high heat capacity heat absorbing (HA) material 40 which allows the rapid transference of heat energy from the battery to the absorber. In accordance with a preferred embodiment, the HA material is selected to exhibit an endothermic phase change, i.e., melt, at a temperature T1 below the temperature which is produced by an electrically shorted battery. As an example, an electrically shorted battery can exhibit a temperature excursion of 120° C. or more and the HA material is preferably selected to exhibit a phase change at a temperature T1 within a range of about 50° C. to 80° C.

A preferred HA material 40 in accordance with the invention includes paraffin and is selected to have a melting point of about 75° C. A preferred heat absorber 38 in accordance with the invention is comprised of a mat 42 formed of fibrous material, preferably having dielectric properties such as KEVLAR or fiberglass. The fibrous mat 42 is utilized to contain and provide a form to the HA material mass 40. More particularly, the preferred heat absorber 38 is formed by depositing melted HA material 40 onto the fibrous mat 42 so that the material surrounds and embeds the mat. The HA material is then allowed to cure so that the absorber 38 comprised of mat 42 and HA material mass 40 forms a solid having an upper surface 43 and lower surface 44. The lower surface 44 can be adhered directly to the battery case surface 39 as shown in FIG. 4.

Figure 5:
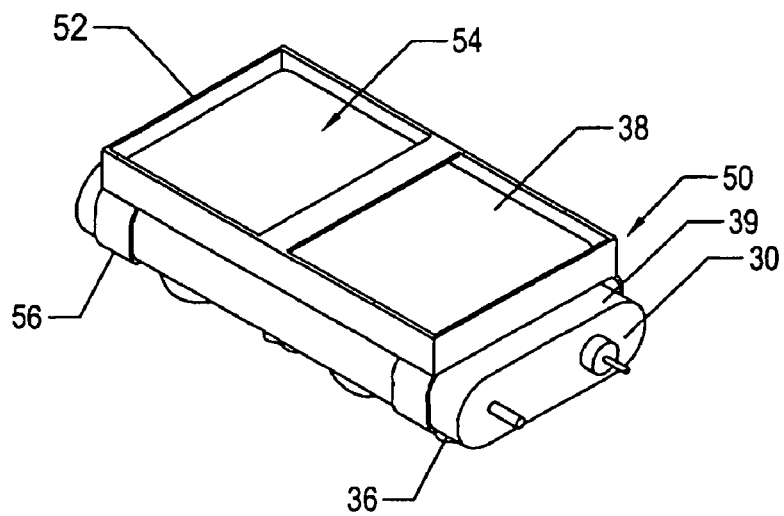
FIG. 5 is an isometric view depicting an alternative manner of thermally coupling the heat absorber to the battery case comprising a caddy configured to carry the absorber and having clips for attaching it to the battery case.

As an alternative to directly mounting the heat absorber 38 to the battery case surface 46, FIG. 5 depicts a caddy 50 configured to (1) carry the absorber 38 and (2) clip to the battery case 36. More particularly, the caddy 50 includes a frame 52 enclosing an open area 54 for accommodating the heat absorber 38. The frame 52 has depending resilient clips 56 secured thereto. The clips 56 are dimensioned and shaped to clip around the battery case 36 to mount the heat absorber 38 immediately adjacent to the battery case surface 39.

Note that regardless of whether heat absorber 38 is secured directly to the battery case or carried by caddy 50, it is preferable to space its upper surface 43 from the housing cover member 26 (FIG. 4) to reduce heat conduction to the housing 22. Similarly, the battery case 36 should preferably be spaced from the floor portion 31 of the housing mounting member 24, e.g., by dielectric spacers 60, to reduce heat conduction to the housing 22.

FIG. 6 depicts a typical temperature excursion 70 which can be produced by a battery in response to an electric short, either internal or external, in the absence of a heat absorber in accordance with the present invention. Plots 72 and 74 depict reduced temperature excursions attributable to the use of different amounts of HA material in accordance with the invention closely thermally coupled to the battery case 36.

The amount of heat energy Q which can be absorbed by the heat absorber 38 is of course dependent on the quantity and characteristics of the HA material used. This relationship can be expressed as:

$$Q = \int_{T_I}^{T_F} C_p \cdot dT + \Delta H_f$$

where

Q represents heat energy absorbed $T_1$ represents initial temperature $T_F$ represents final temperature $C_P$ represents the heat capacity of the HA material mass $\Delta H_f$ represents the heat of fusion The following table depicts properties of a preferred HA material, paraffin, as compared to other materials typically used in a battery. Also shown are properties of alternative, but less effective HA materials polypropylene and polyethylene. Still other alternative HA materials can be used; e.g., Aerogel ($SiO_2$).

|  | Heat Capacity (J/g-K) | Latent Heat of Fusion (kJ/kg) | Melting Temp (° C.) | 0-100° C. Q (J/g) |
| --- | --- | --- | --- | --- |
| Copper | 0.385 |  | 1083 | 39 |
| Aluminum | 0.9 |  | 658 | 90 |
| Negative Active Material | 1.184 |  | 120 | 118 |
| Separator | 2.066 |  |  | 207 |
| Positive Active Material | 1.134 |  |  | 113 |
| Paraffin | 3.26 | 147 | 58 | 473 |
| Polypropylene | 1.83 | 88 | 160 | 183 |
| Polyethylene | 1.78 | 276 | 142 | 178 |

Figure 7:
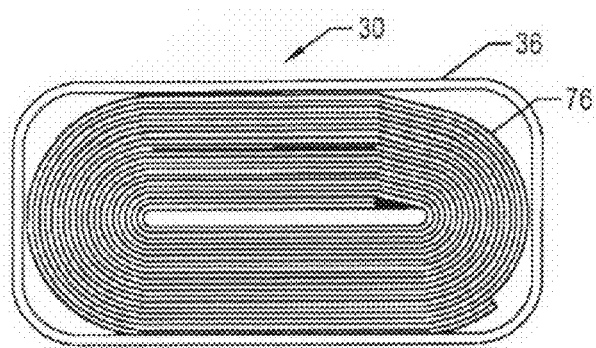
FIG. 7 is a schematic cross section of a typical battery showing a wound, or jellyroll, electrode assembly within the battery case.
Figure 8:
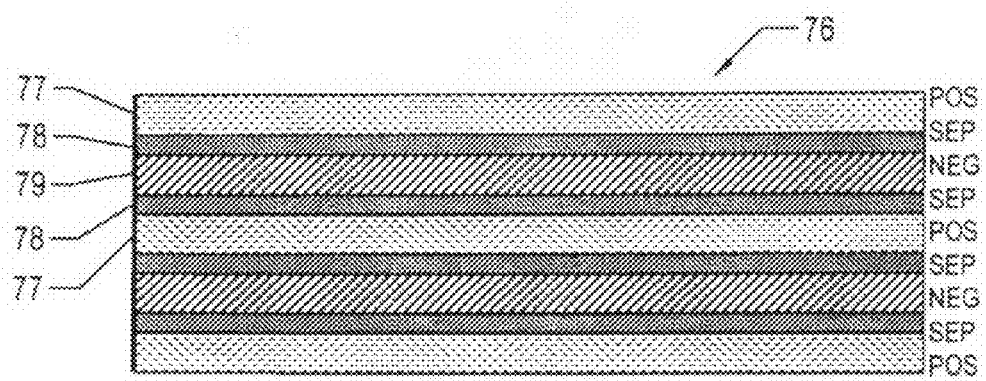
FIG. 8 is a cross section taken substantially along the plane 8-8 of FIG. 7, showing multiple layers of the electrode assembly.

Attention is now directed to FIGS. 7 and 8, which depict an exemplary battery 30 having a case 36 containing an electrode assembly 76. The electrode assembly 76 comprises multiple layers of positive electrode sheets 77, negative electrode sheets 78, and separator sheets 79. These sheets can be stacked or wound into what is sometimes referred to as a "jellyroll". FIG. 8 depicts a cross-section through the electrode assembly 76 of FIG. 7 showing exemplary stacked layers which are arranged pos/sep/neg/sep/pos/sep/neg . . . . That is, adjacent positive and negative electrode layers are separated by a separator layer. A suitable electrolyte (not shown) is contained within the battery case 36 around the electrode assembly 76.

Figure 9:
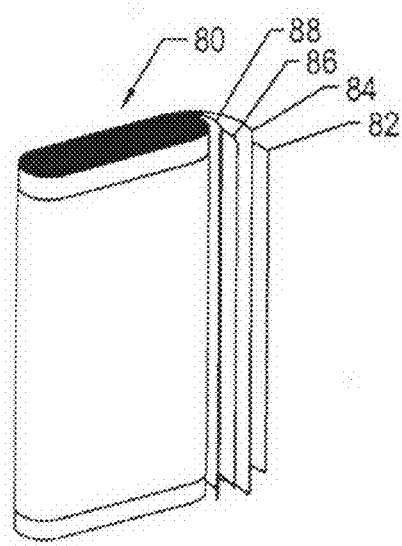
FIG. 9 is a schematic isometric view showing a wound electrode assembly incorporating layers of heat absorbing (HA) material in accordance with the present invention.
Figure 10:
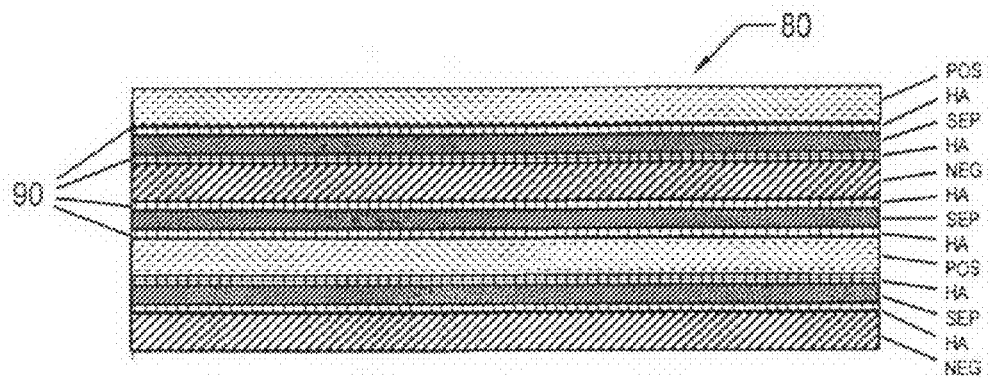
FIG. 10 is a cross section taken through the electrode assembly of FIG. 9 showing HA material layers incorporated in the electrode assembly.

FIGS. 9 and 10 depict an arrangement for incorporating heat absorber material within the battery case of FIG. 7. That is, FIG. 9 shows multiple strips of an electrode assembly 80 including a positive electrode strip 82, a separator strip 84, a negative electrode strip 86, and a separator strip 88. In accordance with the invention as depicted in FIG. 10, layers of heat absorbing (HA) material 90 are additionally incorporated in the stacked layers, e.g., by attachment to both faces of the separator strips. Thus, as depicted in the cross-section of FIG. 10, the layers of the electrode assembly 80 comprise in sequence pos/HA/sep/HA/neg/HA/sep/HA/pos/ . . . .

Figure 11:
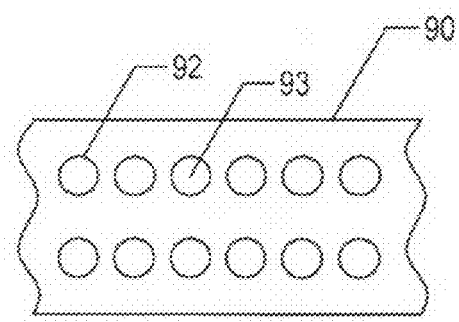
FIG. 11 is an elevation view of an electrode substrate in accordance with an alternative embodiment of the invention showing HA material deposited into recesses or pockets of the substrate.

The layers 90 of HA material can be formed in various ways. Thus, they can comprise sheets of paraffin-based material (solid at body temperature of about 38° C. and which melts at a temperature T1 within the aforementioned range of 50° C. to 80° C.) formed on a fibrous mat and adhered to the separator sheet faces. Alternatively as depicted in FIG. 11, the HA material 90 can constitute a separator strip provided with a matrix of pockets 92 into which HA material 93 is deposited.

Figure 12:
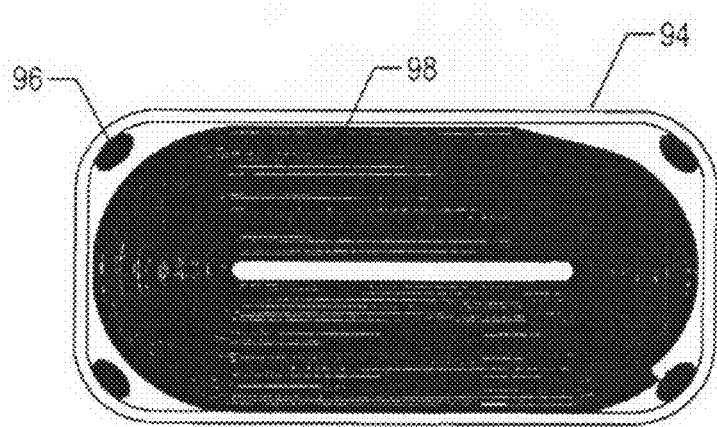
FIG. 12 is a schematic cross section, similar to FIG. 7, showing how HA material can be utilized within the interior volume of the battery case.

Attention is now directed to FIG. 12, which illustrates a still further alternative for incorporating HA material into a battery case 94. In this embodiment, heat absorber material 96 is mounted in the battery case 94, at time of manufacture, around the electrode assembly 98. The heat absorber material 96 is preferably configured around a mat in the manner discussed in connection with FIG. 4. That is, heat absorber material is deposited into a fibrous mat (not shown) so as to embed the mat. The resulting structure of HA material and fibrous mat forms a solid which can be easily mounted in the battery case 94 closely thermally coupled to the electrode assembly 98.

Figure 13:
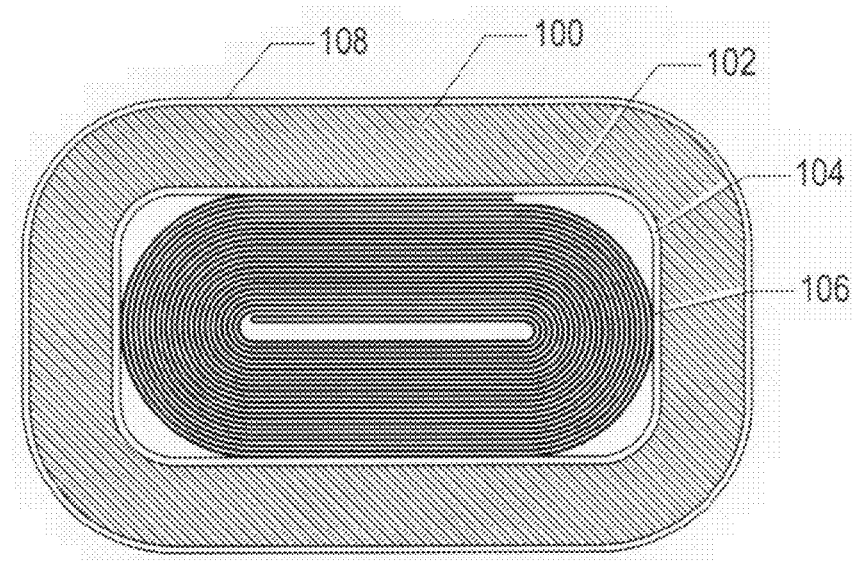
FIG. 13 is a schematic cross section, similar to FIG. 12, showing how HA material can alternatively, or additionally, be deployed around the case exterior wall surface.

FIG. 13 illustrates a still further arrangement for using HA material 100 to limit temperature excursions of battery 102. In the embodiment of FIG. 13, the heat absorber material 100 is mounted around the exterior surface of case 104 which contains the electrode assembly 106. The heat absorber material 100 is preferably formed as previously described by depositing melted HA material onto a fibrous mat which contains and provides structure for the HA material. An outer casing 108 formed, for example, of flexible polymer material can be provided to better contain the HA material 100.

Figure 14:
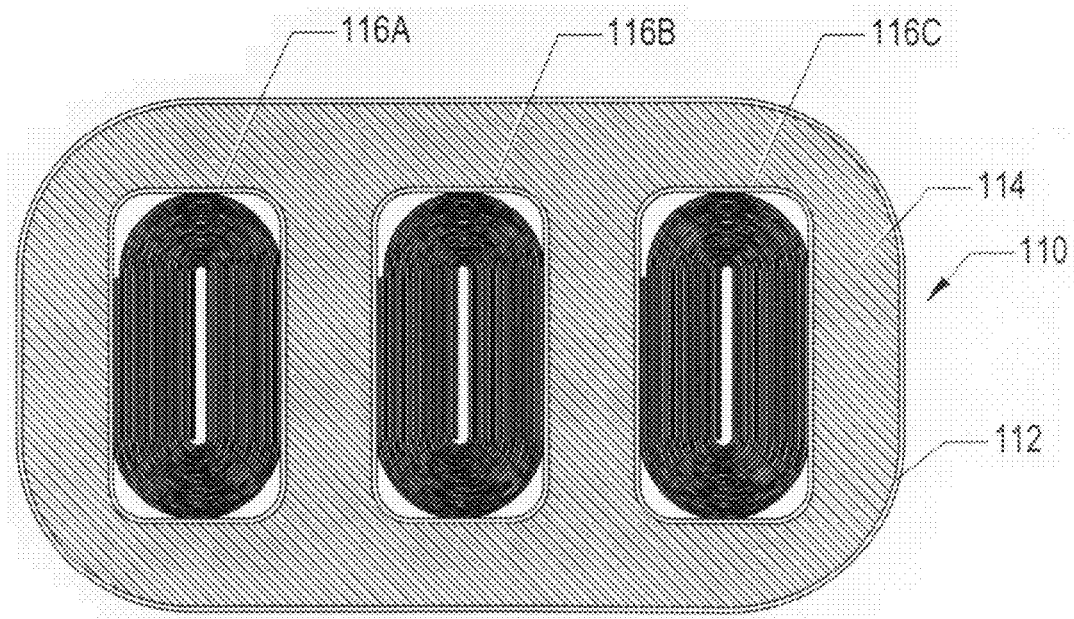
FIG. 14 is a schematic cross section depicting multiple batteries accommodated in a large casing.

FIG. 14 depicts a configuration 110 in which an outer casing 112 contains HA material 114 surrounding a plurality of batteries 116A, 116B, 116C. In the configuration 110, an electric short across one of the batteries will produce a temperature spike which can be contained by the HA material 114, thereby preventing damage to the other batteries as well as surrounding body tissue.

The embodiments depicted in FIGS. 9-14 all utilize a heat absorber in combination with one or more batteries to limit temperature excursions as depicted in FIG. 6. That is, the heat absorber material functions to limit the amplitude of temperature spikes and as a consequence reduces the risk of temperature-induced damage.

From the foregoing it should be appreciated that various configurations have been described for utilizing heat absorber material to limit the amplitude of battery produced temperature excursions. Although multiple geometries have been depicted, it is recognized that various alternative and substantially equivalent arrangements will occur to those skilled in the art which fall within the spirit of the invention and the intended scope of the appended claims.

What is claimed is:

1. A device, comprising:
a battery capable of producing a temperature greater than a temperature T1,
the battery having a case that defines an interior of the case, the case having a lateral wall that connects a top of the case to a bottom of the case,
a top of the lateral wall contacting the top of the case and a bottom of the lateral wall contacting the bottom of the case; and
a heat absorbing material exhibiting a phase change at the temperature T1,
the heat absorbing material contacting the lateral wall of the battery without contacting both the top of the lateral wall and the bottom of the lateral wall.

2. The device of claim 1, wherein the heat absorbing material does not surround the case.

3. The device of claim 1, wherein the top of the case includes terminals for the battery.

4. The device of claim 1, wherein the heat absorbing material is continuous.

5. The device of claim 1, wherein the heat absorbing material includes paraffin.

6. The device of claim 1, wherein the heat absorbing material includes a fibrous mat.

7. The device of claim 6, wherein the fibrous mat includes dielectric fibers.

8. The device of claim 6 wherein the fibrous mat includes fiberglass.

9. The device of claim 1, wherein the case surrounds the batteries.

10. The device of claim 1, wherein the temperature T1 is within the range of 50° C. to 80° C.

11. The device of claim 1, wherein the batteries each includes a positive electrode, a negative electrode, and a separator, and
the temperature T1 is lower than a phase change temperature of the positive electrode, the negative electrode, and the separator.

12. The device of claim 1, wherein the heat absorbing material is not positioned over the top of the case and is also not positioned over the bottom of the case.

13. The device of claim 1, wherein the heat absorbing material includes polyethylene.

14. The device of claim 1, wherein the heat absorbing material includes polypropylene.

15. The device of claim 1, wherein the heat absorbing material includes $SiO_2$.

* * * * *